Patented Aug. 19, 1924.

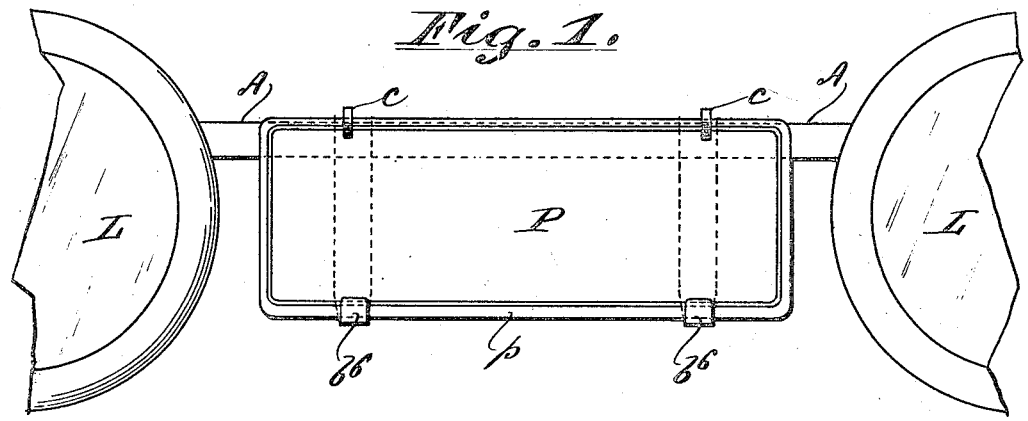
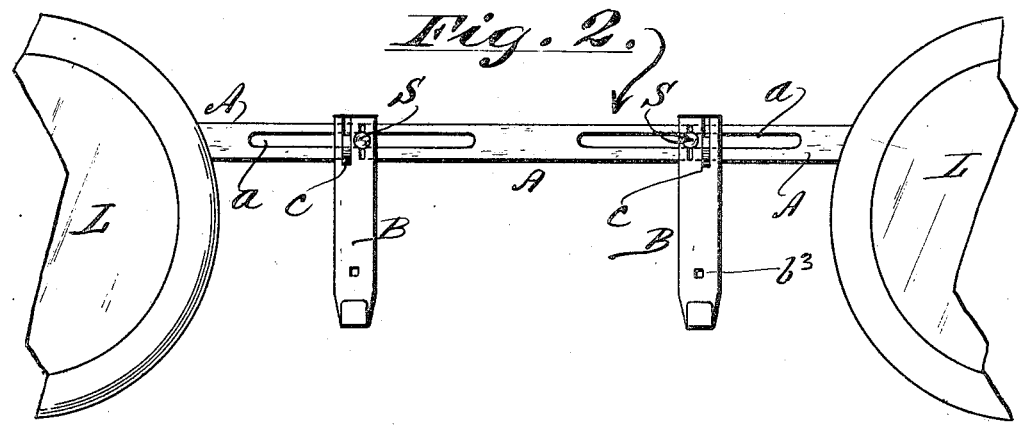
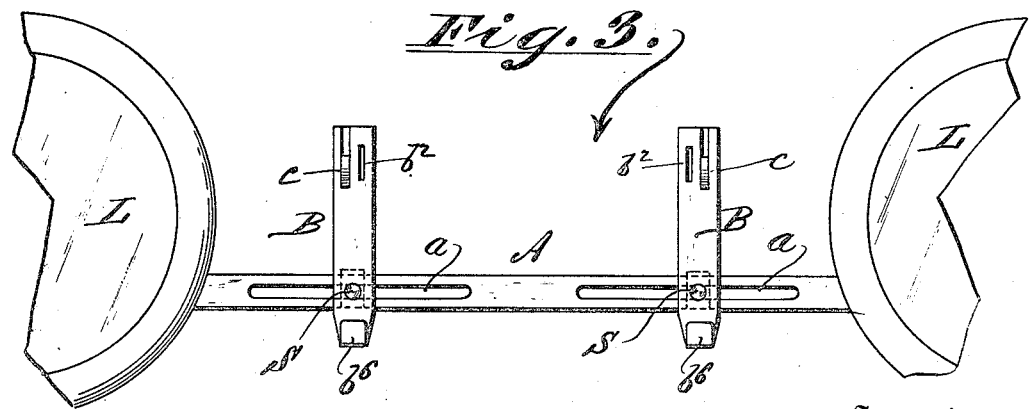

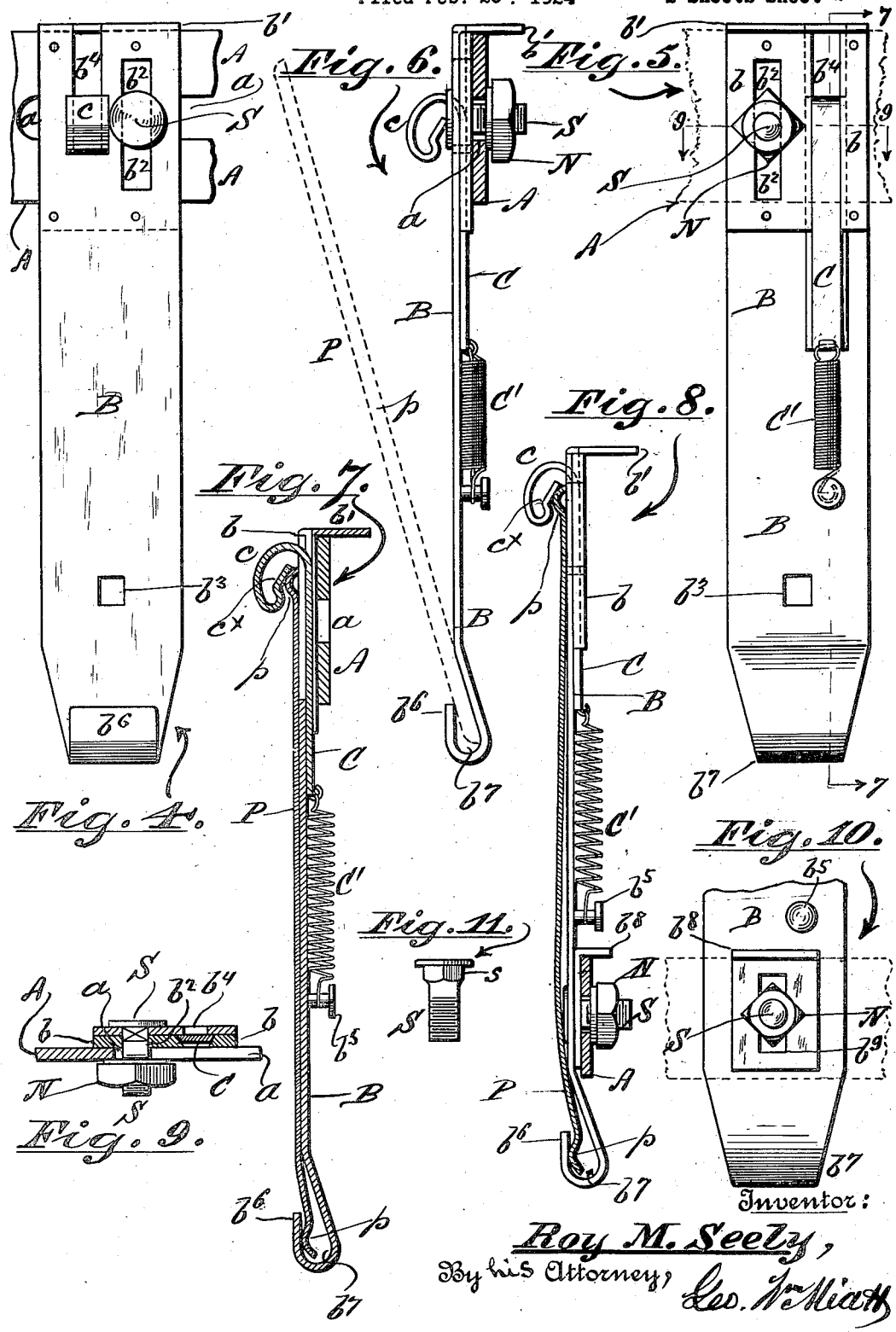
Aug. 19, 1924.
R. M. SEELY
LICENSE PLATE HOLDER
Filed Feb. 25, 1924  2 Sheets-Sheet 2
1,505,608

1,505,608

UNITED STATES PATENT OFFICE.

ROY M. SEELY, OF MIDDLETOWN, NEW YORK.

LICENSE-PLATE HOLDER.

Application filed February 25, 1924. Serial No. 695,124.

*To all whom it may concern:*

Be it known that I, ROY M. SEELY, a citizen of the United States, and a resident of Middletown, Orange County, and State of New York, have invented certain new and useful Improvements in License-Plate Holders, of which the following is a specification sufficient to enable others conversant with the art to which the invention appertains to utilize the same.

The object of my invention is to afford a simple, compact and effective device for detachably securing vehicular license plates in position thereon; and it consists essentially in the specific construction, combination and arrangement of parts and appurtenances herein described and claimed, whereby certain practical advantages are attained over the prior state of the art, all as hereinafter fully set forth.

In the accompanying drawings I illustrate the practical embodiment and use of my device in various ways, although I do not limit myself to the identical form and construction of parts and appurtenances shown by way of exemplification, since modifications in minor details, and equivalent mechanical expedients, may be resorted to with like result, and without departing from the spirit and intent of my invention in this respect.

With this understanding:—

Fig. 1, illustrates the method of suspending a license plate upon the usual front bar provided for the purpose between the headlights of an automobile;

Fig. 2, is a similar view, without the license plate;

Fig. 3, is a like view showing my license plate holders as arranged on the said front bar for supporting the license plate in elevated position;

Fig. 4, is a full sized front elevation of one of my license plate holders or brackets, the license plate being omitted;

Fig. 5, is a rear elevation thereof, showing the supporting bar in dotted lines;

Fig. 6, is an edge or side elevation of the holder as shown in Figs. 4 and 5, the preliminary step in the application of the license plate being indicated in dotted lines;

Fig. 7, is a vertical longitudinal section taken upon plane of line 7—7 Fig. 5, but with the license plate included in position on the holder;

Fig. 8, is a sectional view of a license plate, illustrating the mounting thereof on holders, the lower portions of which are rigidly supported;

Fig. 9, is a transverse horizontal section taken upon plane of line 9—9 Fig. 5;

Fig. 10, is an elevation of the lower mounting means illustrated in Fig. 8 and taken at right angles thereto;

Fig. 11, is a detail view of the securing bolt.

It is to be understood that two or more of my license plate holding and securing devices B, (which function essentially as bracket members) are to be used in conjunction with a supporting bar A, or equivalent fixed part on an automobile or other type of vehicle on which the display of license number is essential. Thus, in the first three figures of the drawings, my brackets B, are shown as attached to the horizontal bar A, extending between the headlights L, L, of an automobile, motor truck, or the like, said bar A, being formed with the longitudinal slots $a$, $a$, through which the shanks $s$, $s$, of the securing bolts S, S, extend,—said elongate slots $a$, $a$, affording ample scope for lateral adjustment of the brackets B, B, as related to each other and the varying requirements of use.

Each bracket B, consists primarily of a single plate, preferably metallic, to the upper portion and rear side of which the cap plates $b$, $b$, are integrally united, so as to form practically a component part thereof,—the opposed inner parallel edges of said cap plates $b$, $b$, being bevelled as shown more particularly in Fig. 9, of the drawings, to constitute the ways for the retention and guidance of the clamping latch plate C, slidably mounted therebetween.

The top of the bracket plate B, is formed with a rearwardly projecting shoulder $b'$, for engagement with the upper edge of the supporting bar A, when the bracket is suspended thereon as illustrated in Fig. 1, of the drawings, said shoulder $b'$, in conjunction with the securing bolt S, maintaining the desired vertical alignment of the bracket and preventing looseness or play of parts N, is the binding nut.

In this connection it is to be noted that the shanks s, of the securing bolts S, are square in cross section to fit snugly the bolt holes a, $b^2$, and $b^3$, so that the bolts can not turn therein, said bolts being screw threaded only beyond said rectangular portions thereof, as shown more particularly in Figs. 9 and 11, of the drawings, thereby insuring rigidity to the license plate mount considered in a unitary sense,—said license plate P, being of the usual prescribed form and having the customary edge bead or embossment p.

The clamping latch plate C, as before stated, is slidably mounted on the bracket plate B, its upper portion c, protruding through the vertical play slot $b^4$, formed for the purpose in the upper portion of said bracket plate B, and said upper extremity of the latch plate C, being bent over upon itself to form an inturned tongue $c^x$, for contact with the upper edge of the license plate P, as shown more particularly in Figs. 7 and 8, of the drawings. The clamping or latch plate C, being preferably metallic, the head portion c, $c^x$, thereof has more or less inherent elastic resilience; and said curved head portion c, $c^x$, also functions as convenient manipulative means for raising and adjusting the latch plate C, against the resistance of its retractile spring C', for the purpose of effecting the positioning of the license plate P, on the bracket B,—said retractile spring C', being attached to the lower end of the latch plate C, and to a stud $b^5$, affixed to the rear side of said bracket plate B, as shown in Figs. 5, 6, 7 and 8, of the drawings.

It will also be seen by reference more particularly to Figs. 6, 7 and 8, of the drawings, that the lower extremity of each bracket plate B, is stirrup shaped, the lower edge $b^6$, of the plate being bent and upturned to form a retaining lip in approximate alignment with the body of the plate B, and a recess or pocket $b^7$, being thus formed between said lip and the adjoining lower portion of the bracket B, for the accommodation of the lower edge of the license plate P, the flexibility of the latter being relied upon to yield to the insertion behind the lip $b^6$, of the lower edge of the license plate P, said lip thereby functioning in conjunction with the spring latch plate C, to hold the license plate firmly in position.

When the license plate P, is to be installed above the support A, as indicated in Figs. 3, 8 and 10, of the drawings, a supplementary shoulder plate $b^8$, is used in conjunction with the clamping screw C, so as to afford a rectangular bearing against the lower portion of said support A, as shown more particularly in Figs. 8 and 10, in which case the rectangular shank s, of the screw bolt S, is positioned in the square hole $b^3$, of the bracket B,—said supplementary shoulder plate $b^8$, being formed with an elongate slot $b^9$, as shown in Fig. 10, to admit of accuracy of adjustment.

A plurality of my license plate brackets or holders, thus constructed and arranged, afford effective means whereby a vehicular license plate may be quickly and conveniently installed in position, and firmly sustained therein. Furthermore, my device is not only comparatively simple and inxpensive as compared with the prior state of the art, but is adapted to compensate readily for variations in both size and shape of the license plate incidental to interstate regulations and requirements.

What I claim as my invention and desire to secure by Letters Patent is,—

1. As an article of manufacture, a license plate holder of the character designated, comprising a bracket plate formed at its upper extremity with a rectangular bearing shoulder for engagement with a support and at its lower extremity with a stirrup for engagement with the lower edge of a license plate, and a slidably mounted spring actuated latch plate for engagement with the upper edge of said license plate, substantially in the manner and for the purpose set forth.

2. As an article of manufacture, a license plate holder of the character designated, comprising a bracket plate formed at its lower extremity with a stirrup for engagement with the lower edge of a license plate, and a slidably mounted spring actuated latch plate for engagement with the upper edge of said license plate, together with a supplementary shoulder plate and means for securing said bracket plate and supplementary shoulder plate rigidly to a support affixed to a vehicle, substantially in the manner and for the purpose set forth.

3. As an article of maufacture, a license plate holder of the character designated, comprising a bracket plate formed at its lower extremity with a stirrup for engagement with the lower edge of a license plate, and at its upper extremity with a rectangular bearing shoulder for engagement with a support, a spring actuated latch plate slidably mounted on said bracket plate, and adapted to engage with the upper edge of said license plate, and clamping means for securing said bracket plate rigidly to a support affixed to a vehicle, substantially in the manner and for the purpose set forth.

4. As an article of manufacture, a license plate holder of the character designated, comprising a bracket plate formed at its lower extremity with a stirrup for engagement with the lower edge of a license plate, and at its upper extremity with a rectangular bearing shoulder for engagement with a support, a spring actuated latch plate slidably mounted on said bracket plate, and adapted to engage with the upper edge of said license plate, a supplementary shoulder plate, and clamping means for securing said bracket plate rigidly to a support affixed to a vehicle, substantially in the manner and for the purpose set forth.

ROY M. SEELY.

Witnesses:
GEO. WM. MIATT,
MATHILDA STEUERNAGEL.